United States Patent [19]

Hejman et al.

[11] Patent Number: 4,818,296

[45] Date of Patent: Apr. 4, 1989

[54] SCRAPER FOR SUGAR CENTRIFUGE

[75] Inventors: Conny Hejman; Làszlò Korán; Bo Mossheden, all of Hässleholm, Sweden

[73] Assignee: Nils Weibull AB, Hasselhölm, Sweden

[21] Appl. No.: 126,126

[22] Filed: Nov. 27, 1987

[30] Foreign Application Priority Data

Sep. 21, 1987 [SE] Sweden ................................ 8703657

[51] Int. Cl.[4] ............................ C13F 1/06; C13F 1/10; B01D 33/00; F22B 37/48

[52] U.S. Cl. ............................................ 127/2; 127/9; 127/19; 15/256.5; 15/246.5; 210/375; 210/396; 494/56; 494/57; 494/58

[58] Field of Search .................. 127/2, 9, 19; 210/375, 210/396; 494/56-58; 15/256.5, 246.5

[56] References Cited

U.S. PATENT DOCUMENTS

| | | | |
|---|---|---|---|
| 1,102,530 | 7/1914 | Mackintosh | 210/375 |
| 3,216,042 | 11/1965 | Strittmatter | 15/246.5 |
| 3,446,431 | 5/1969 | Marchal et al. | 210/375 |
| 4,095,307 | 6/1978 | Brubaker | 15/246.5 |
| 4,735,688 | 4/1988 | Schwab et al. | 15/256.5 |

*Primary Examiner*—H. M. S. Sneed
*Assistant Examiner*—Chung K. Pak
*Attorney, Agent, or Firm*—Brooks & Kushman

[57] ABSTRACT

A scraper for a sugar centrifuge comprises a scraper blade mounted on an arm which is moved down into and pivoted within the centrifugal bowl, such that the edge of the scraper blade is moved against but out of contact with the bowl wall for scraping off the sugar adhering to the bowl wall. After the scraping edge, the scraper blade has an afterscraper in direct or indirect contact with the bowl wall. The afterscraper comprises in one embodiment a block whose boundary plane facing the scraping edge forms an acute angle with the tangential plane along the line of contact of the block with the bowl wall. In another embodiment, a rail or flange is mounted on or formed in one piece with the scraper blade on the rear side of the scraping edge and arranged at a distance from the wall, in order to define, together with the rear side of the scraper blade and along the scraping edge, a channel for taking up sugar which fills out and solidifies within said channel, thereby building up a solid formation of sugar in contact with the bowl wall.

4 Claims, 4 Drawing Sheets

Fig.4.
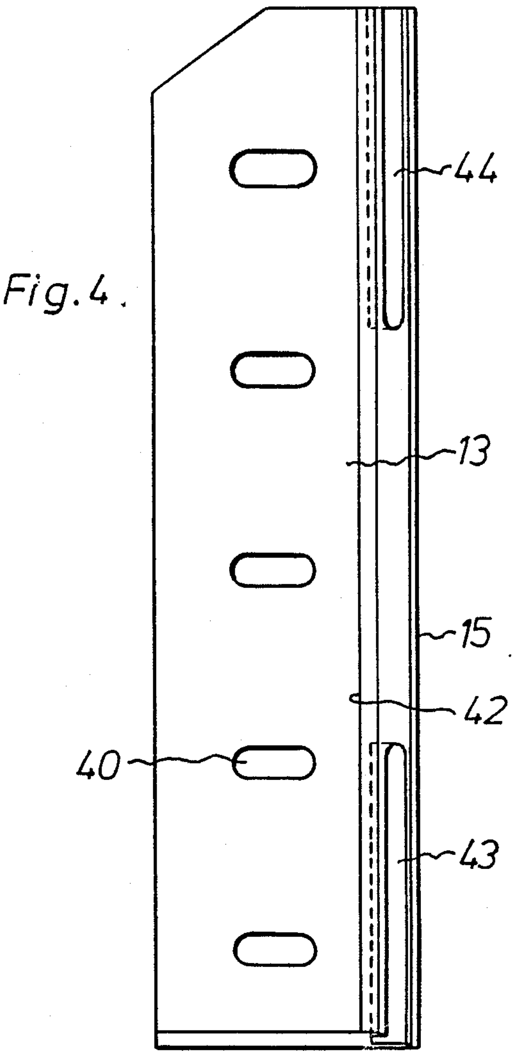
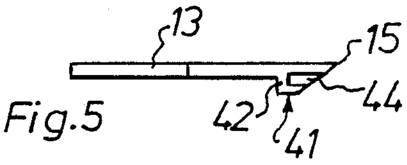
Fig.5

SCRAPER FOR SUGAR CENTRIFUGE

BACKGROUND OF THE INVENTION

For emptying the bowl of a sugar centrifuge, a scraper is positioned adjacent the inner bowl wall, thereby to remove the centrifuged material adhering to the wall. Normally, the scraper is mounted on a shaft which is inserted in the bowl through the opening in the top of the bowl, and from a starting position at the top of the bowl, the scraper is first swung against the wall and then moved therealong toward the bottom of the bowl. According to one school of opinion, the scraping edge should be in contact with the bowl wall, while others maintain that the scraping edge should be close to but out of contact with the wall. In the first case, the bowl wall will be cleaned, but the wear on the wire cloth of the centrifugal bowl is considerable, while in the other case a layer of sugar remains on the wall and the wire cloth, respectively, and must be washed off; in this case the wear will be insignificant.

The present invention relates to a scraper for sugar centrifuges, comprising a scraper blade mounted on an arm insertable in the centrifugal bowl and pivotal therein, said scraper blade having a tip with a scraping edge positionable close to but out of contact with the inner bowl wall and movable along said wall for scraping off sugar during rotation of the bowl.

The scraper blade is provided, after the scraping edge and in connection therewith, with an afterscraper which is in direct contact or, via a sugar formation retained by said afterscraper, in indirect contact with the inner bowl wall.

SUMMARY OF THE INVENTION

The present invention aims at providing an arrangement by which all sugar is gently and carefully removed, i.e. an arrangement which combines the advantages and eliminates the shortcomings of prior art technique.

BRIEF DESCRIPTION OF THE DRAWINGS

The invention will be described in more detail below, reference being had to the accompanying drawings illustrating several embodiments. In the drawings.

FIG. 4 is a lateral view of a scraper tip according to a third embodiment of the invention; and FIG. 5 shows the scraper tip according to FIG. 4 as seen from one end.

DETAILED DESCRIPTION OF THE INVENTION

Figure 1:
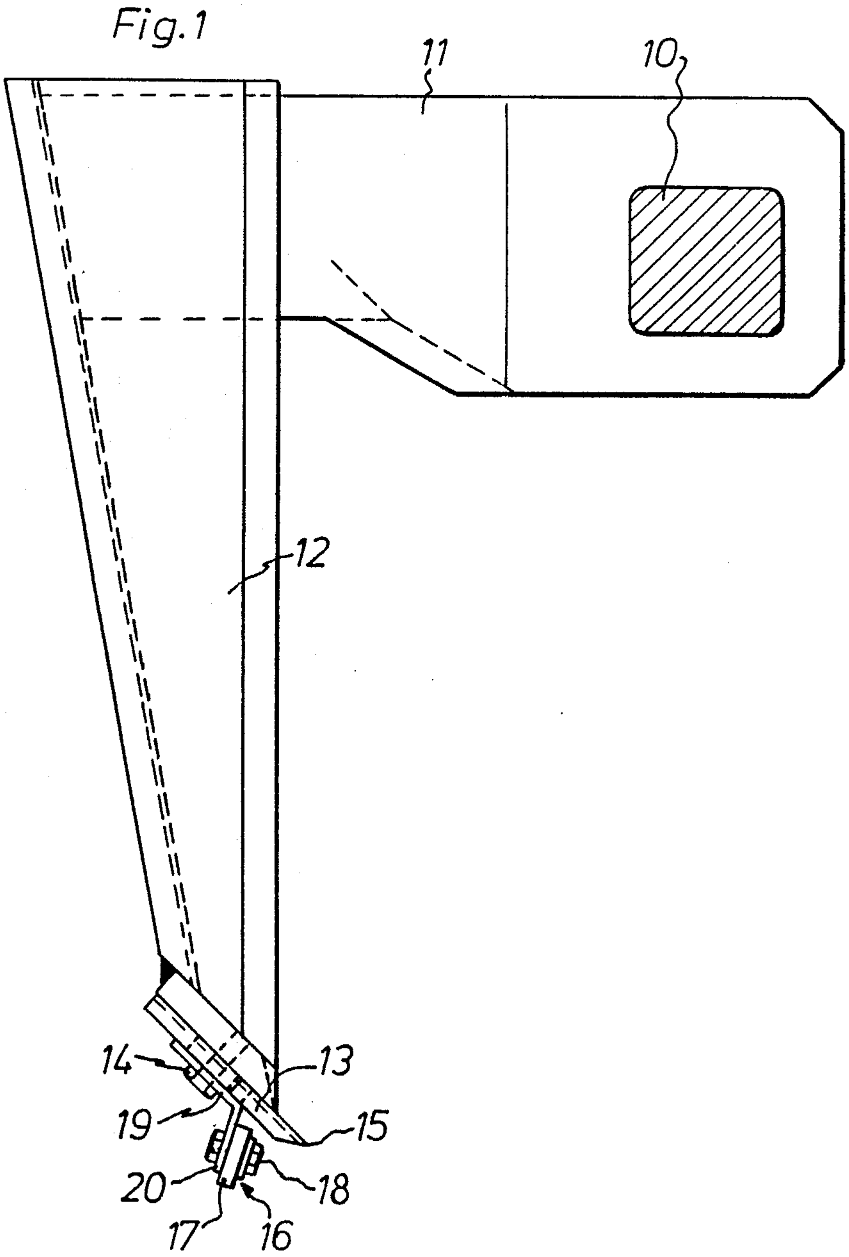
FIG. 1 is a top plan view of a scraper according to a first embodiment of the invention.
Figure 2:
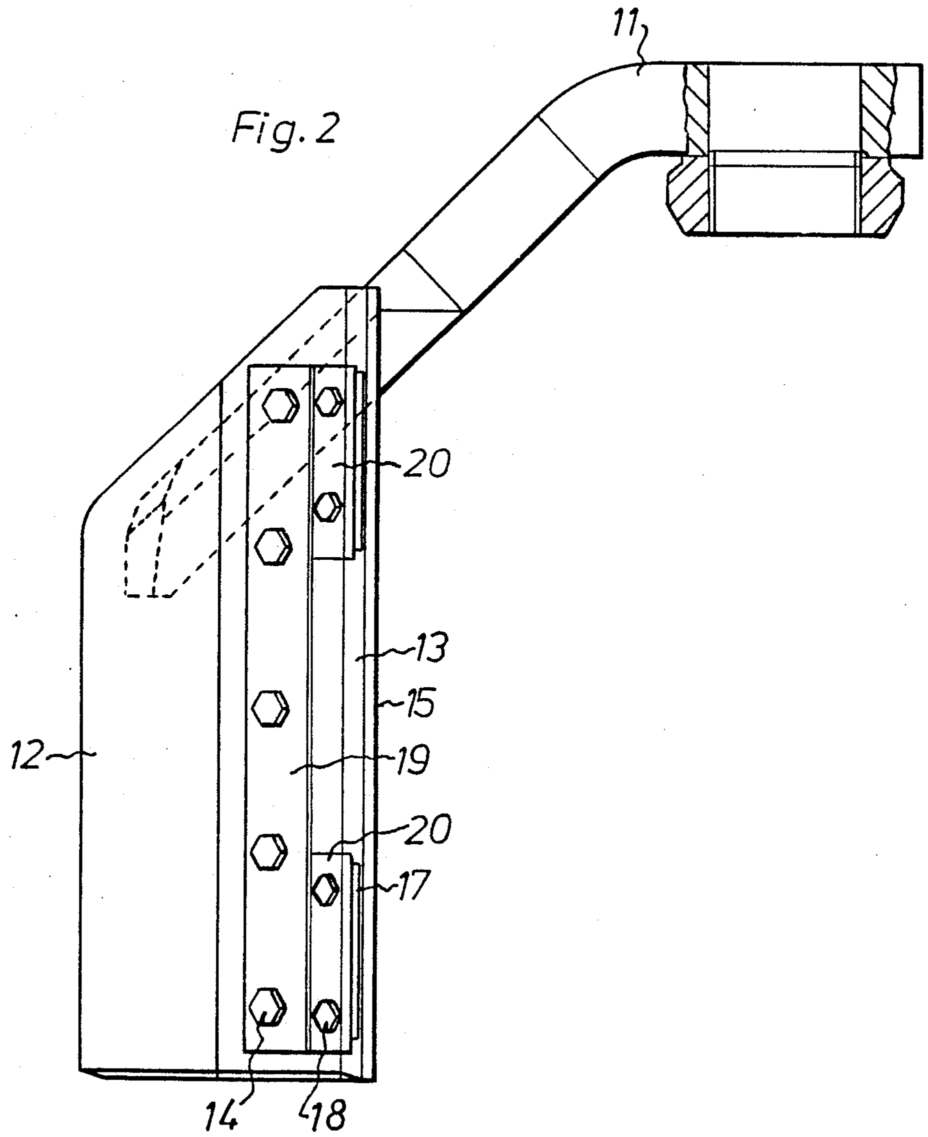
FIG. 2 is a lateral view of the scraper shown in FIG. 1.

Secured to an axially movable and pivotal shaft 10 indicated by dash lines in FIG. 1 and mounted above the bowl of a sugar centrifuge, is an arm 11 which carries a scraper blade 12 having at its end facing away from the arm 11 a scraper tip 13 provided with a forward scraping edge 15 and secured by means of bolts 14. By means of the shaft 10 and the arm 11, the scraping edge 15 is movable along the inner bowl wall, the arrangement being such that, upon scraping, the tip 15 is closely spaced from the bowl wall. The scraper tip 13 is so oriented that, during scraping, it forms an obtuse angle with the inner side of the centrifugal bowl to provide for maximum scraping efficiency. However, since the scraping edge 15 is slightly spaced from the wall, there will remain, as has been pointed out above, a sugar layer on the wall, and to remove this sugar layer an afterscraper generally designated 16 in FIG. 1 is mounted on the rear side of the scraper tip 13. The afterscraper comprises a rail 19 mounted on the rear side of the scraper tip 13 by means of the bolts 14 and extending along the major part of the length of the scraper tip 13, as will appear from FIG. 2. At each of its ends, the rail 19 has a flange 20 extending a predetermined distance toward the middle of the rail, such that a gap is formed between the flanges 20, as shown in FIG. 2. A scraping block 17 of plastic or metal is secured by means of bolts 18 to each flange 20 and projects so far that it engages the inner wall of the bowl when the scraping edge 15 is at a slight distance therefrom. Because of the flanges 20, the blocks 17 will form, with their forward side, an acute angle with the inner wall of the bowl and with the tangential plane along the line of contact of the block with the wall, respectively.

Operation of the arrangement shown in FIGS. 1 and 2 will remove most of the sugar by means of the scraper 12, 13, while the remaining sugar layer on the wall is removed by the blocks 17 of the afterscraper in a gentle and careful manner since the blocks are moved along the wall at a favourable angle. It may happen that the sugar in the space between the scraper tip 13 and the afterscraper solidifies, but since the flanges are relatively short, they are also slightly resilient, whereby the scraping block 17 to some extent is freely movable during scraping so that the solidified sugar is detached and drops down. The arrangement as shown in FIGS. 1 and 2 is extremely simple and can be mounted on existing scrapers.

Figure 3:
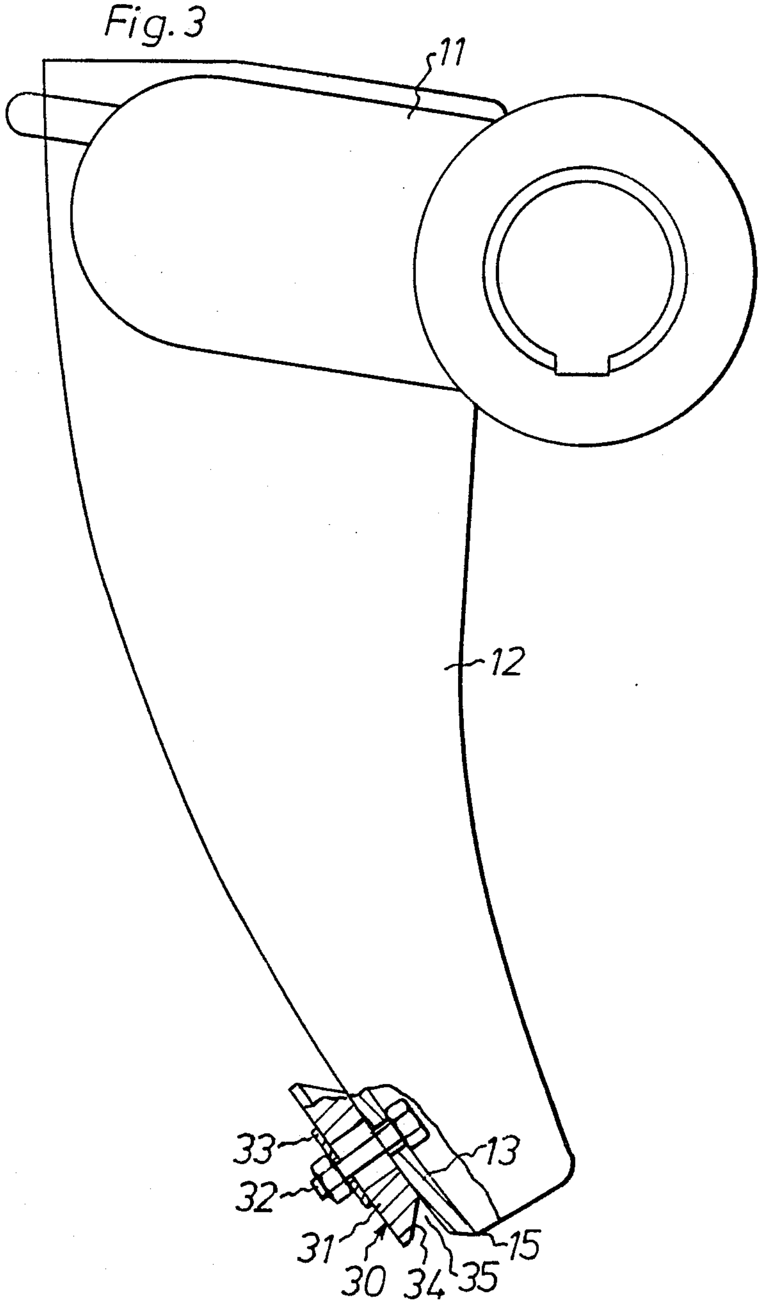
FIG. 3 is a top plan view of a second embodiment of the invention.

The scraper design shown in FIG. 3 is slightly different from the one shown in FIG. 1 and has a scraper tip 13 provided with an edge 15 and made in one piece with the main part of the scraper. In this embodiment, the afterscraper 30 is in the form of a rail 31 which is secured, by means of bolts 32 and shims 33, to the rear side of the scraper tip 13 near the edge-carrying end of said tip. The rail 31 is undercut, as shown at 34, so that an approximately triangular space 35 is defined on the rear side of the scraper tip 13 immediately behind the edge 15. The rail 31 can extend along the entire length of the scraper, although it is preferred, as in the embodiment described above, to provide two rails 31 each at one end of the scraper tip.

The scraper according to FIG. 3 is mounted such in the bowl that neither the edge 15 nor the end of the rail 31 facing said edge will be in contact with the wall. During scraping, sugar rests will enter the space 35 where they solidify and gradually fill out the entire space 35 up to and into contact with the adjacent bowl wall. During scraping, this build-up or formation of solidified sugar will be urged against the bowl wall and remove the sugar rests after the edge 15. The character of the solidified sugar is such that its engagement with the wall will be relatively soft, and this means that the wear will be insignificant.

While the scraper tips according to FIGS. 1 and 3 are of relatively conventional design, the scraper tip according to FIGS. 4 and 5 is a new construction in that it has a thicker portion along the edge, into which channels 43, 44 open toward the bowl wall project through a predetermined distance, one from each scraper tip end in parallel with the edge. By means of these channels 43, 44 which have predetermined dimensions, angle flanges 42 are formed which terminate at a distance from one another and here constitute the afterscraper 41. These angle flanges may, of course, also be welded to the rear side of the scraper tip 13, but arranging the channels 43, 44 in a thicker portion extending throughout the length of the scraper tip is advantageous in that it improves the stiffness of the scraper tip. The end of the scraper tip 13 facing the bowl wall is beveled, as shown in FIG. 5, such that the angle flange end facing the wall will lie at least equidistantly, but preferably even farther away from the bowl wall than the edge 15.

The scraper tip according to FIGS. 4 and 5 secured to a scraper blade by means of bolts extending through holes 40 and is used in the same manner as the arrangement according to FIG. 3, i.e. during scraping the sugar in the channels 43, 44 solidifies, and a solid formation of sugar engaging the bowl wall is collected therein for removing the sugar rests after the edge 15.

What we claim and desire to secure by Letters Patent is:

1. A sugar centrifuge having a centrifugal bowl with an inner bowl wall and a scraper system, the system comprising:

and arm (11) insertable in the centrifugal bowl and pivotal therein;

a scraper blade (12) mounted on said arm and having a rear side and a tip (13) with a scraper edge (15), said scraping edge being close to but out of contact with the inner bowl wall and being movable along said inner bowl wall for scraping off sugar during rotation of the bowl; and an afterscraper (16), mounted on the scraper blade rear side and adapted to be directly or indirectly, via a sugar formation retained by said afterscraper, in engagement with said inner bowl wall the afterscraper further including at least one rail (31) and defining, with the scraper blade (12) adjacent the edge (15), a space (35) along the scraping edge (15) said space being adapted to take up sugar which, after solidification and filling of said space (35), constitutes the sugar formation in contact with the bowl wall.

2. The sugar centrifuge as claimed in claim 1 wherein the afterscraper further (16) includes a flange (19) and at least one scraping block (17) replaceably mounted on the flange (19) and forming, with its forward boundary plane facing the edge (15), an acute angle with the tangential plane along the line of contact of the block (17) with the inner bowl wall.

3. The sugar centrifuge as claimed in claim 1 wherein the afterscraper (41) is in the form of a flange made in one piece with the scraper blade (12) behind the scraping edge thereof, said flange being directed toward and terminating at a distance from the bowl wall which is at least equal to the distance from the edge (15) to said bowl wall, said flange defining, with the rear side of the scraping edge, at least one channel (43, 44) adapted to take up sugar which, after solidification and filling of said channel (43, 44) constitutes the formation in contact with the bowl wall.

4. A sugar centrifuge as claimed in any one of the preceding claims wherein the afterscraper (16) extends along a part of the total length of the scraping edge (15).

* * * * *